US006366630B1

(12) United States Patent
Okuyama

(10) Patent No.: US 6,366,630 B1
(45) Date of Patent: Apr. 2, 2002

(54) APPARATUS WITH DIGITAL INTERFACE AND DIGITAL INTERFACING METHOD

(75) Inventor: Takehiko Okuyama, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/167,531

(22) Filed: Oct. 7, 1998

(30) Foreign Application Priority Data

Feb. 7, 1997 (JP) .............................................. 9-025625

(51) Int. Cl.[7] .............................................. H04L 7/00
(52) U.S. Cl. ...................................... 375/356; 370/503
(58) Field of Search ................................ 375/354, 356, 375/358, 372, 377; 327/141; 348/500; 370/521, 503

(56) References Cited

U.S. PATENT DOCUMENTS 3,808,368 A * 4/1974 Pitroda et al.
4,122,477 A * 10/1978 Gallo
4,397,016 A * 8/1983 Broussaud
5,524,107 A * 6/1996 Duggan et al.
5,737,336 A * 4/1998 Takeda ........................ 370/539

FOREIGN PATENT DOCUMENTS

JP        5-143507      6/1993
JP        8-69683       3/1996
JP        08279818 A    10/1996

* cited by examiner

Primary Examiner—Jean Corrielus
(74) Attorney, Agent, or Firm—Pillsbury Winthrop LLP

(57) ABSTRACT

An apparatus which can achieve a synchronous dubbing and can record new data at a position just after data previously recorded without an unnatural gap and without using a buffer memory with large capacity. A reference signal from a cylinder servo circuit/tape transport servo circuit of a transmitter is converted into an isochronous packet. The packet is sent out from a digital interface transmitting circuit to a 1394 cable. On the reception side, an isochronous packet converter circuit restores a received isochronous packet into an original reference signal and sends it to the cylinder servo circuit/tape transport servo circuit. By so doing, the transmitter and the receiver are synchronized with each other, and it becomes possible to achieve a synchronous dubbing and to record new data at a position just after data previously recorded without an unnatural gap. Then the transmitter sends out dubbing data and the receiver receives it. The transmission reproduction processing and the reception recording processing are performed at the timing of the reference signal, so no buffer memory for timing adjustment is required.

4 Claims, 12 Drawing Sheets

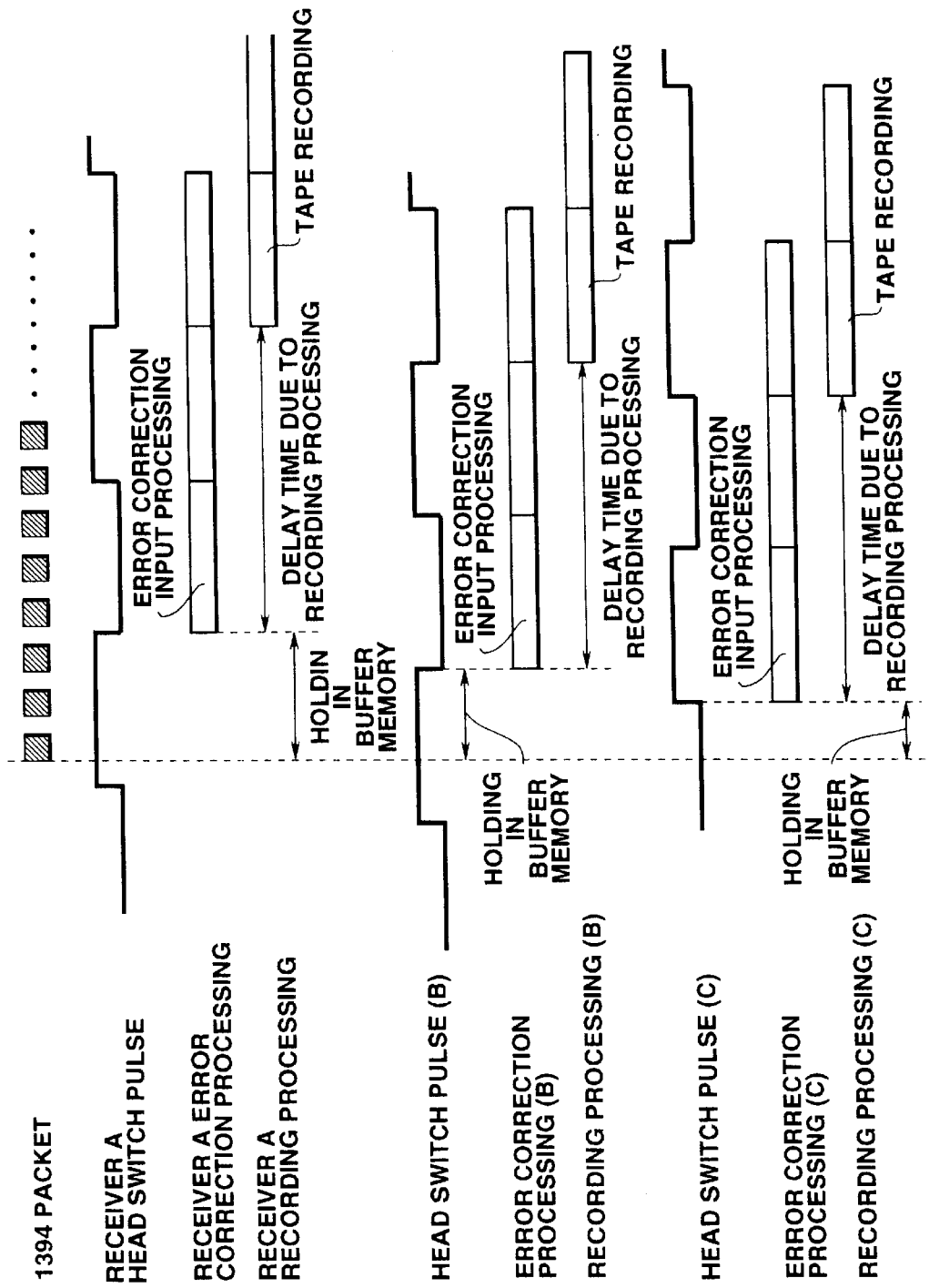

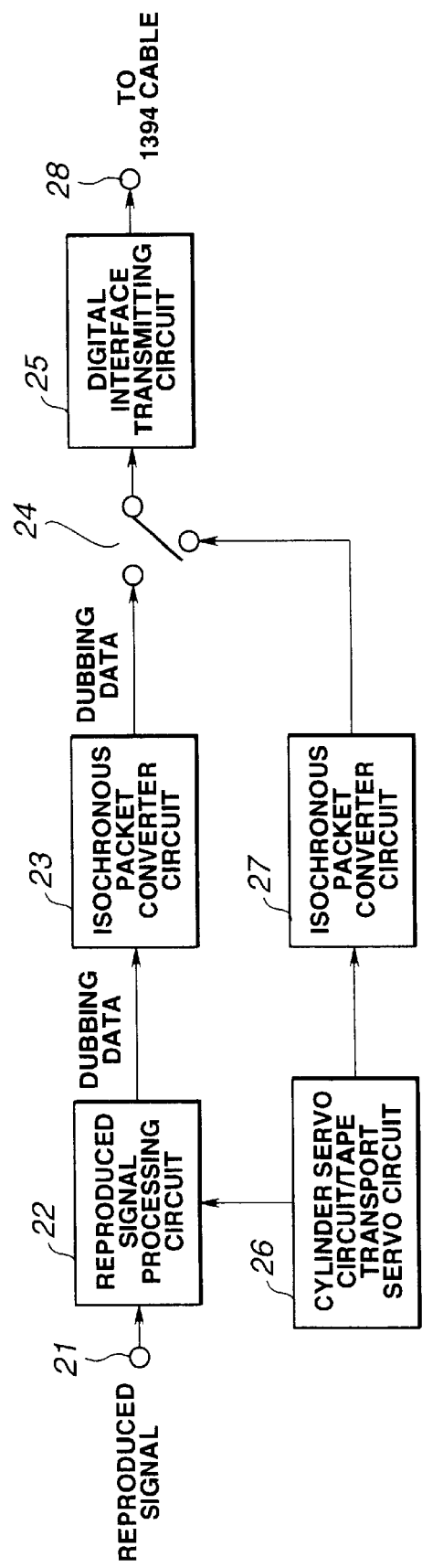

APPARATUS WITH DIGITAL INTERFACE AND DIGITAL INTERFACING METHOD

This is a Continuation International Appln. No. PCT/JP98/00473 filed Feb. 5, 1998 which designated the U.S.

TECHNICAL FIELD

The present invention relates to an apparatus with a digital interface suitable for dubbing recording by a network conforming to IEEE 1394 standards, and a digital interfacing method

BACKGROUND TECHNOLOGY

Recently, image digital processing has been investigated. Also various systems have been under investigation for digital image data recording by a magnetic recording/reproducing device (VTR). For example, in Japan, the Home Digital VTR (Video Tape Recorder) Council has established SD (Standard Definition) standards for recording a SD signal such as an NTSC signal and a PAL signal as it is, namely, as a digital signal by compressing it, and HD (High Definition) standards for recording an HD signal such as an HDTV (High Definition TV) baseband signal as it is, namely, as a digital signal by compressing it. A home digital VTR (hereinafter, called a DVTR) will be commercially availably soon.

Generally speaking, if an image signal is digitized, its information content becomes enormous. Therefore, it is difficult to transmit or record the digitized signal without compressing it, in view of the communication rate and cost. In the case of the SD standards and the HD standards, a digital image signal is compressed in frames.

FIG. 1 is the recording format of a tape conforming to the SD standards.

FIG. 1 shows a recording track 16 formed on the tape 15. As shown in FIG. 1, the recording track 16 comprises a plurality of areas corresponding to various data kinds. That is, the recording track 16 consists of an ITI (Insert and Track Information) including an SSA (Start-Sync Block Area) and TIA (Track ID Area), an audio area, a video area, a subcode area, etc. These areas are sequentially arranged from the bottom edge to the top edge of the tape 15. Gaps 1–3 as well as an amble part are provided between these areas. When the tape is traced by a magnetic head, the ITI, the audio area, the video area and the subcode area are sequentially recorded or reproduced.

The magnetic head traces the tape according to the timing of a head switch pulse shown in FIG. 2. The tape is traced by the rotary head at the rise timing and the fall timing of the head switch pulse in FIG. 2. The head switch pulse is generated synchronously with a frame pulse as shown in FIG. 2. In the case of the SD standards, as shown in FIG. 2, the head traces the tape ten times during one frame period. That is, one frame is recorded on ten tracks.

The time required to trace one track is one tenth of one frame period. FIG. 3 shows data which is transmitted during one track period. As shown in FIG. 3, one track period is 3.33 milliseconds. During this period, all the data recorded in the above-mentioned areas, namely, the ITI, the audio area, the video area and the subcode area are transmitted. The head switch pulse is a reference signal for track recording by the DVTR. Cylinder servo is applied according to this head switch pulse.

In the case of the SD format of a home digital VTR, data is recorded on each track using one sync block as a recording unit. Each sync block is 90 bytes in length and contains 2-byte synchronizing signal (SYNC) and 3-byte ID.

The video area shown in FIG. 1 contains 2-byte SYNC, 3-byte ID, 77-byte video data area, 8-byte horizontal parity C1 and 77-byte vertical parity C2. The video area contains three video auxiliary data areas (VAUX0, VAUX1 and VAUX2), each being one-sync-block long, 135-sync-block long video data area and 11-sync-block long vertical parity C2.

The DVTR can record not only an analog TV signal after compressing it but also a digital data directly. FIG. 4 is a block diagram of the art relating to the DVTR which inputs and outputs digital data only.

IEEE (The Institute of Electrical and Electronics Engineers, Inc.) 1394 which is a low-cost peripheral interface suitable for multimedia applications is now widespread as the unified standards of a digital interface system for data transmission/reception among digital image devices. The IEEE 1394 makes it possible to multiplex a plurality of channels. The IEEE 1394 has an isochronous transfer function which guarantees the transfer of image, audio data, etc., within a given time, so it is the digital interface suitable for image transmission. Published Unexamined Patent Application No. 8-279818 (No. 279818/1996) discloses the IEEE 1394 in detail.

With the device shown in FIG. 4, a cable conforming to the IEEE 1394 standards is connected with a terminal 1. A 1394 circuit 2 is used to control a link layer and a physical layer of a digital interface conforming to the IEEE 1394 standards. The circuit receives data flowing on the 1394 cable (not shown) connected with the terminal 1 and sends the data to a digital I/F packet converter circuit 3, and at the same time sends data from this packet converter circuit 3 to the 1394 cable.

The digital I/F packet converter circuit 3 converts a packet conforming the IEEE 1394 standards into a packet conforming to the SD standards and vice versa. The 1394 packet is converted into the SD standards packet by the digital I/F packet converter circuit 3 to be fed to a correcting encoding/decoding circuit 5. In the case of the SD standards, the digital I/F converter circuit 3 converts a one-sync-block long data input into one DIF (Digital Interface) block. At the same time, this converter circuit converts one-track data into a 150 DIF block. The data is input/output in a 150-DIF-block unit.

In addition, the output of the digital I/F packet converter circuit 3 is rearranged by, for example, the correcting encoding/decoding circuit 5 into a data sequence shown in FIG. 1. The correcting encoding/decoding circuit 5 reads out data stored in a memory 6, arranges the vertical parity C2 (outside code) for error correction for the data arranged in the track direction in FIG. 1, and arranges the horizontal parity C1 (inside code) for the data arranged in the sync direction. The error correcting encoding/decoding circuit 5 adds the outside code and the inside code to the data and outputs the data in the format sequence shown in FIG. 1 to a modulator/demodulator circuit 7. This error correction processing is controlled by a microcomputer 10.

The output of the error correcting encoding/decoding circuit 5 is modulated by the modulator/demodulator circuit 7 and is recorded on the tape 9 by an amplifier equalization detecting circuit 8.

As described above, in the case of the SD standards, one frame is recorded on ten tracks. However, the SD standards do not permit a change to part of the content of the system data in one-frame recording unit. It is impossible to change the data from any track in one frame.

The Home Digital VTR Council is determined to adopt MPEG 2 system as a compression system for the next-generation digital broadcasting, ATV and DVB. The ATV standards and the DVB standards adopt a system which records data compressed by the MPEG 2 system as it is. The SD standards and the HD standards adopt an in-frame compression system. The MPEG 2 system adopts not only in-frame compression but also interframe compression coding. That is, MPEG 2 data has no fixed frame length, and the number of the tracks required for one-frame data recording is variable. Therefore, data is recorded in a track unit, and the subcode, the VAUX and the AAUX are also recorded in a track unit. Accordingly, in this case, the error correcting encoding/decoding circuit 5 can correct an error in a memory which can store data for a few tracks.

That is, in the error correction processing, first, the outside code (C2) is encoded, then the inside code (C1) is encoded for data containing such is encoded outside code. Therefore, it is necessary for the error correction encoding/decoding circuit 5 first to store data recorded in the track direction which is required to generate such an outside code in order to add the outside code to the data. Accordingly, to encode the outside code, two memories are required: one memory which can store one-track data and another memory which can store one-track data to generate the outside code after reading the data from the above-mentioned memory.

Since the inside code is encoded in a sync block unit, this encoding process can be performed simultaneously with the output process to the modulator/demodulator circuit 7. These processings are performed cyclically for data sequentially input in a track unit. So, by using each memory of one-track capacity for each processing described above, the input and the outside code addition as well as the inside code addition and the output can be performed by a memory which can store n-track data.

As described above, the device shown in FIG. 4 can store digital data of a plurality of standards, Transmission protocol and synchronizing procedure among different standards such as the MPEG 2 standards and the DVTR standards are now being standardized in the IEC 1883.

With the present protocol draft, a transmission side converts isochronous data into an isochronous packet conforming to the IEEE 1394 standards before transmitting the data. When this data having the same timing as that of a reference signal of the original data to be transmitted, for example, a data group containing a head data of one frame is converted into a packet, and a flag such as a frame pulse indicating a reference signal is inserted in the header data of the isochronous packet.

A reception side extracts the header flag of a received packet to adjust a frame start timing by the flag indicating the head of one frame. By so doing, it is possible to synchronize the transmission side with the reception side.

FIG. 5 is a timing chart showing the synchronization process described above. FIG. 5 shows the synchronization process among a plurality of devices. FIG. 5 shows the following processings etc. from top to bottom: a 1394 packet; a receiver A head switch pulse, an error correction processing and a recording processing; a receiver B head switch pulse (B), an error correction processing (B) and a recording processing (B); and a receiver C head switch pulse (C), an error correction processing (C) and a recording processing (C).

As described above, on the reception side DVTR, a delay time of n-track periods usually occurs in the error correction processing in the error correcting encoding/decoding circuit 5 shown in FIG. 4. That is, the output of the digital I/F packet converter circuit 3 shown in FIG. 4 is recorded on the tape 9 with the delay time of n-track periods due to the error correction processing and the recording processing. FIG. 5 shows an example one head switch pulse period. As shown in this Fig., two tack periods (the recording processing delay time in FIG. 5) is required for the error correction processing.

A cylinder rotation servo operates according to the head switch pulse (FIG. 5) indicating one track period as a reference signal. The data output timing from the modulator/demodulator circuit 7 to the amplifier equalization detecting circuit 8 is regulated by the head switch pulse. The present processing rate of the modulator/demodulator circuit is 24 bits, so the delay time due to modulation/demodulation processing can be ignored.

Therefore, the output timing of the error correcting encoding/decoding circuit 5 is almost equal to data recording timing on the tape 9. The timing is delayed by n-track period due to the error correction processing, so generally, as shown in FIG. 5, the input timing of the error correction processing is synchronized with the data recording start timing signal based on he head switch pulse as a reference signal.

For example, as shown in FIG. 5, the receiver A sends the output of the digital I/F packet converter circuit 3 based on the 1394 packet to the error correcting encoding/decoding circuit 5 at the head switch pulse timing to start the error correction processing. The error correction processing requires two track periods. Data is magnetically recorded on the tape 9 from the amplifier equalization detecting circuit 8, two track periods later from the input to the error correcting encoding/decoding circuit 5. As shown in FIG. 5, the receivers B and C perform the error correction processing and the recording processing at the timing according to the head switch pulses (B) and (C) of these receivers.

As described above, the error correction input processing is performed synchronously with the head switch pulse of each receiver A, B and C. So it is necessary to hold the input 1394 packet for the delay time shown in FIG. 5. Therefore, the device shown in FIG. 4 has a buffer memory 4. The digital I/F packet converter circuit 3 uses the buffer memory 4 to synchronize the output to the error correcting encoding/decoding circuit 5 with the head switch pulse.

To dub data from one DVTR to another DVTR, a DVTR on the reception side records one-frame data on 10 tracks. Therefore, it is necessary to record a frame head data on the first tack of these 10 tracks.

To synchronize digital data to be input into the DVTR with the tape so that such data is recorded at the tape recording start position, namely, at the head track of one frame, two methods, namely, synchronization on the reception side and synchronization on the transmission side are available.

Let us assume that a DVTR on the recording side is going to start data recording at a certain point on a recorded tape. Then, it is necessary to start data recording at the head track of one frame, namely, at a track (hereinafter called a head track) which continues with data already recorded on a frame unit (in a 10-track unit) in order to record a tracking pilot signal for synchronizing a servo.

FIG. 6 is a diagram for illustrating the tracking pilot signal.

With the embodiment shown in FIG. 6, three signals having the frequencies f0, f1 and f2 (hereinafter called pilot signals F0, F1 and F2) are used as a tracking pilot signal. These pilot signals F1, F0, F2, F0, F1, F0, F2, F0, . . . are recorded sequentially and overlappedly. In reproduction, the levels of the pilot signals F1 and F2 contained in reproduced signals are compared. It is so controlled that the track phase coincides with a track on which the pilot signal F0 is superimposed. In this case, taking the deviated direction of the track phase into consideration, the track phase can be coincided with the track of the pilot signal F0 at every fourth track.

If data recording starts at any track other than the head track of each frame shown in FIG. 6, then the pilot signals are arranged in an incorrect order and the tracking servo does not function normally. Therefore, it is necessary to start new data recording from a track (head track shown in FIG. 6) next to the last track of the last frame of data previously recorded.

With synchronization on the reception side, the receiver should be set in standby mode at the last track of the frame of data already recorded. That is, tape transport should be stopped but the cylinder should be kept rotating while synchronizing the servo with the reference signal (the head switch pulse). Here too, the frame reference signal (the frame pulse) must be kept being generated to start data recording at a head frame.

With the receiver kept in standby mode, a transmitter sends data through the 1394 cable. The receiver shown in FIG. 4 first receives data, then holds the data so that the output of the error correcting encoding/decoding circuit 5 starts at a timing n-track (two tracks in FIG. 5) prior to the head track using a buffer memory 4. The digital I/F packet converter circuit 3 outputs data read out from the buffer memory 4 to the error correcting encoding/decoding circuit 5 at a position n-track prior to the head track. When the head track position is reached, the transport of the tape 9 starts, and the recorded data from the amplifier equalization detecting circuit 8 is recorded on the tape 9. By so doing, data at the head of a frame can be recorded properly from the head track.

However, when using this method, the buffer memory 4 should have a capacity to store data up to one frame (10 tracks), so circuit scale becomes large.

With synchronization on the transmission side, a transmitter may adjust the transmission timing. That is, the transmitter may adjust the transmission timing so that the receiver can receive data at a position n-track prior to a head frame so as to record data at a head frame. With this method, the receiver may use a buffer memory of relatively small capacity as a buffer memory 4 for adjusting data input timing to the error correcting encoding/decoding circuit 5.

However, no protocol suitable for this method is available.

In addition, this method may be used when that data is exchanged between one transmitter and one receiver. However, as shown in FIG. 5, this method may not be used in such a case that a plurality of receivers receive data from one transmitter. That is, as shown in FIG. 5, the reference signal (the head switch pulse) of each receiver is generated independently of each other and the position of the head track of each receiver is different from each other. Therefore, if the transmitter sends out data synchronously with one receiver, data received by other receivers is not synchronized with their reference signal. The frame reference signal reception positions of these receivers are different from each other by up to one frame, so any receiver which has received synchronized data must have a buffer memory whose capacity is up to one frame.

To transmit data synchronously with all the receivers from the transmission side, a transmitter must be equipped with frame memories in the number corresponding to the number of the receivers.

Using an alternate synchronizing method, a servo reference signal may be inserted in isochronous data. Thus, on the reception side, synchronization is achieved using a servo reference signal.

However, the receiver starts servo pull-in operation after receiving isochronous data, so a relatively long time is required until the servo phases of all the receivers are locked. Therefore, it is necessary for each receiver to hold the data in the buffer once until the phases coincide with each other. Therefore, a memory with large capacity is required as a buffer memory.

As described above, to record transmitted digital data, a buffer memory with large capacity is required for synchronization resulting in increased circuit scale.

To record received data from a correct recording start position, a buffer memory with large capacity is required resulting in increased circuit scale.

To record received data at a position just after data previously recorded without an unnatural gap, a buffer memory with large capacity is required resulting in increased circuit scale.

To dub data synchronously by a plurality of devices, a buffer with large capacity is required resulting in increased circuit scale.

It is an object of the present invention to provide an apparatus having a digital interface which can record data synchronously, can record new data at a position just after data previously recorded without an unnatural gap and can perform a synchronous dubbing operation by a plurality of devices without using a buffer memory with large capacity and a digital interfacing method.

DISCLOSURE OF THE INVENTION

One aspect of the present invention is to provide an apparatus having a digital interface that comprises a timing reference signal transmitting means which is installed in one or more first devices in a network comprising a plurality of devices, converts an original timing reference signal into first data to be transmitted synchronously and sends out the data to a transmission path forming the network; a timing reference signal generating means which is installed in a second device other than the first device(s) in the network and generates a timing reference signal based on the original timing reference signal transmitted through the transmission path; a transmitting means which is installed in a device in the network, converts a predetermined transmitted data into second data to be synchronously transmitted, synchronously with the original timing reference signal of the timing reference signal and sends out the resulting data to the second data to be synchronously transmitted through the transmission path, and records the recorded data synchronously with the original timing reference signal or the timing reference signal.

In this apparatus, the original timing reference signal is converted into the first data to be synchronously transmitted by the original timing reference signal transmitting means of the first devices(s) and is sent out to the transmission path. The timing reference signal generating means of the second devices other than the first devices receives the transmitted original timing reference signal and obtains its own timing reference signal. By this signal, the second devices other than the first device(s) are synchronized with each other. A device equipped with the transmitting means converts predetermined transmitted data into the second data to be synchronously transmitted according to the original timing reference signal or the timing reference signal and sends out the resulting data to the transmission path. The second data to be synchronously transmitted is received by the receiving means of the receiving device and recorded synchronously with the original timing reference signal or the timing reference signals. Both the device having the transmitting means and the device having the recording means are synchronized according to the original timing reference signal, so they can record new data synchronously or continuously just after data previously recorded without an unnatural gap.

Another aspect of the present invention is to provide a digital interfacing method that comprises a timing reference signal transmitting procedure in which an original timing reference signal from one or more first devices in a network comprising a plurality of devices is converted into first data to be synchronously transmitted and the resulting data is sent out to a transmission path in the network; a synchronizing procedure in which the original timing reference signal transmitted through the transmission path is receive by a second device other than the first device(s) in the network and synchronized with the received signal by obtaining a recording timing reference signal based on the transmitted original timing reference signal; a transmitting procedure in which a predetermined transmission data is converted into the second data to be synchronously transmitted by the device in the network according to the original timing reference signal or the timing reference signal and sent out to the transmission path; and a recording procedure in which the second data to be synchronously transmitted is received by the device in the network through the transmission path and is synchronized with th original timing reference signal or the timing reference signal to record it.

In this method, the first data to be synchronously transmitted that is based on the original timing reference signal and the timing reference signal is sent out from the first device(s) to the transmission path. The second device other than the first device(s) obtains a timing reference signal based on the transmitted original timing reference signal. By this timing reference signal, the devices in the network are synchronized with each other. When such synchronization is achieved, the device on the transmission side sends out the second data to be synchronously transmitted based on the transmission data to the transmission path. This transmission is made synchronously with the original timing reference signal or timing reference signal. The device in the reception side receives second data to be synchronously transmitted, synchronously with the original timing reference signal or timing reference signal and records the received data. By so doing, a plurality of data can be synchronously recorded and new data recording can be started at a position just after data previously recorded without an unnatural gap.

BRIEF DESCRIPTION OF THE DRAWING

FIG. 5 is a timing chart showing the operation of the DVTR shown in FIG. 4.

FIGS. 7 and 8 are block diagrams of an embodiment of an apparatus having a digital interface according to the present invention.

BEST MODE OF CARRYING OUT THE INVENTION

Figure 8:
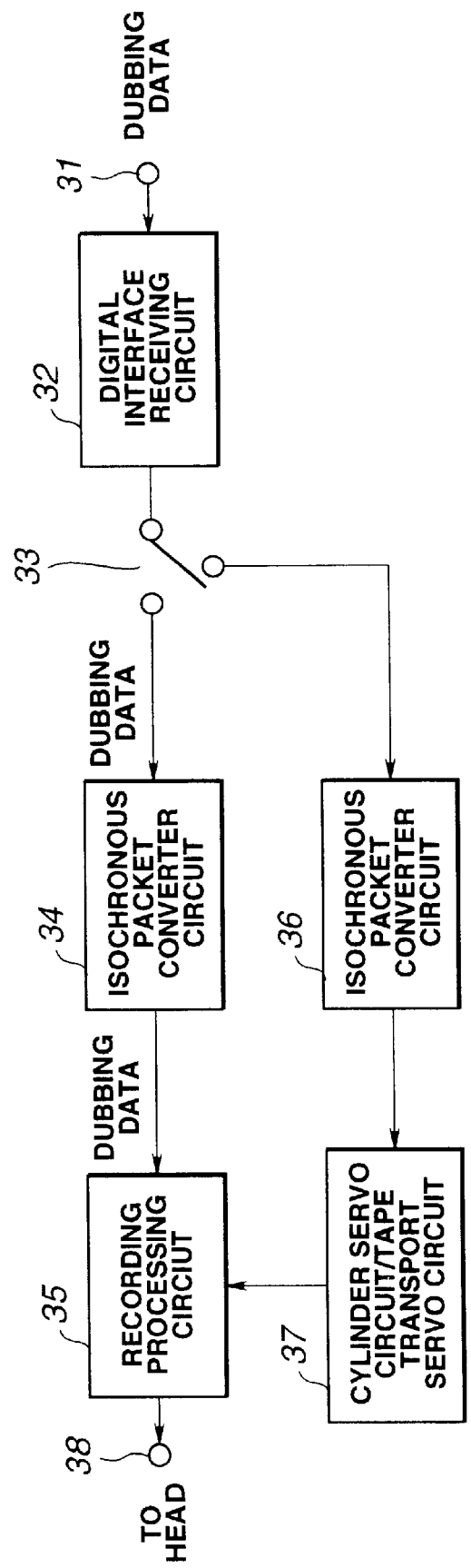
Figure 9:
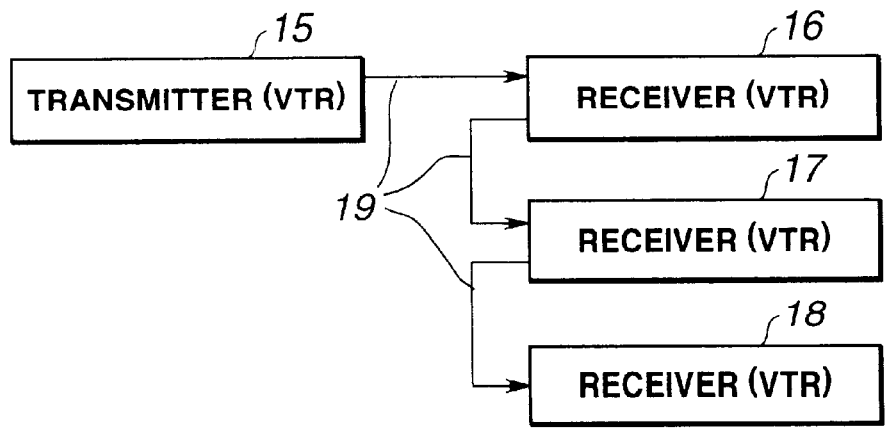
FIG. 9 is a network comprising an apparatus having a digital interface of the embodiment shown in FIGS. 7 and 8.

Several embodiments of the present invention will be described below in detail with reference to the accompanying drawings. FIGS. 7 and 8 are block diagrams showing an embodiment of an apparatus having a digital interface according to the present invention. FIG. 7 is the transmission side. FIG. 8 is the reception side. FIG. 9 is the network comprising an apparatus having a digital interface according to an embodiment of the present invention.

FIG. 9 is an example of a network comprising one transmitter 15 and three (3) receivers 16–18. The transmitter 15 and the receivers 16–18 are, for example, digital VTRs. In FIG. 9, for example, an IEEE 1394 cable which can transmit and receive isochronous data is employed as the transmission path 19. In the network of this embodiment, data for synchronization is transmitted prior to the transmission of data to be recorded.

Figure 1:
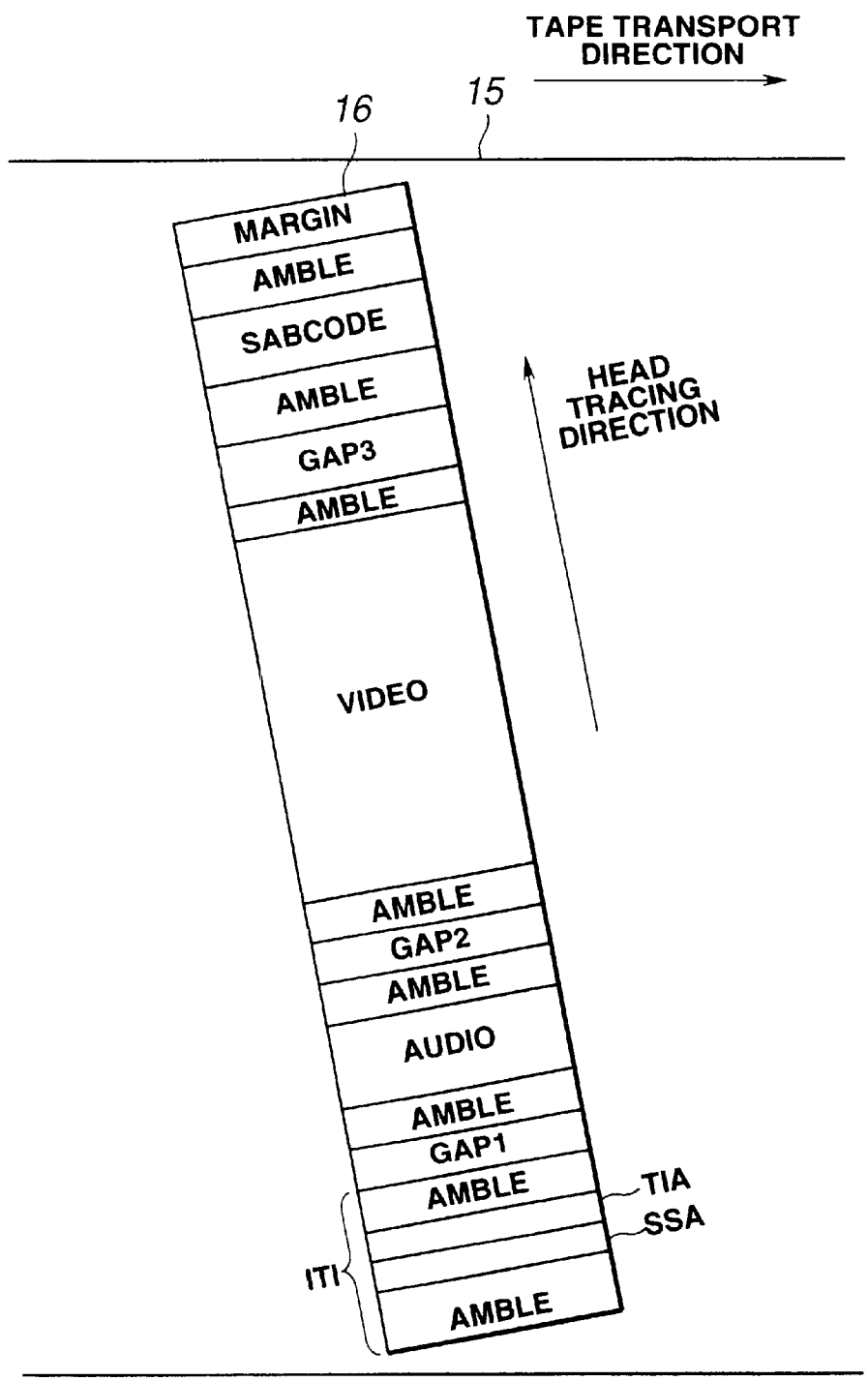
FIG. 1 is a recording format of the SD standards.
Figure 2:
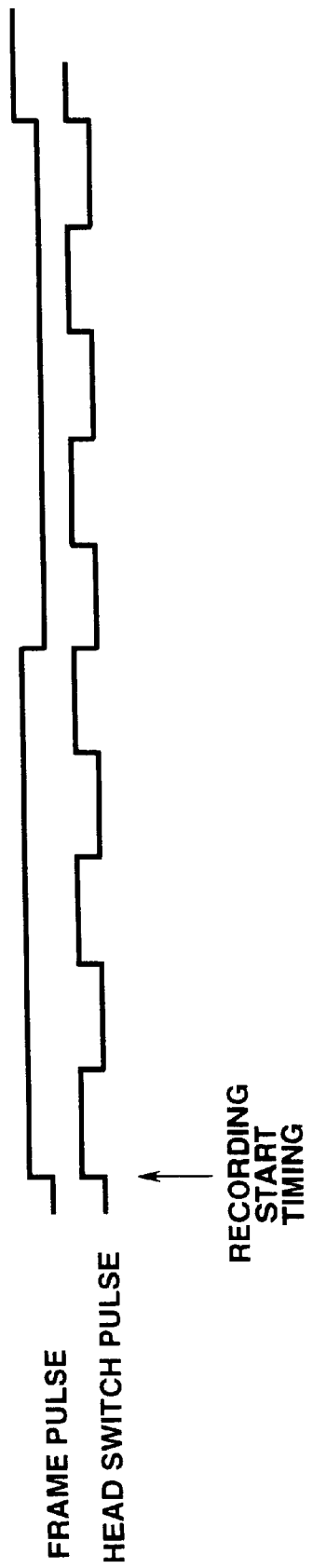
FIG. 2 is a frame pulse and a head switch pulse.
Figure 3:
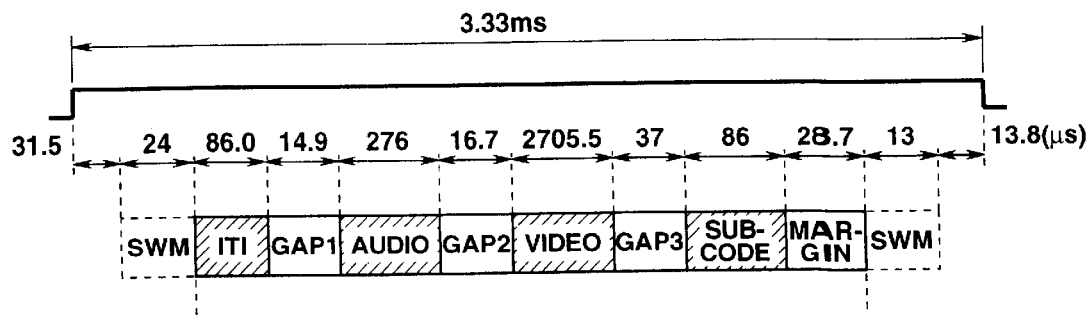
FIG. 3 is data to be recorded on a tape.
Figure 6:
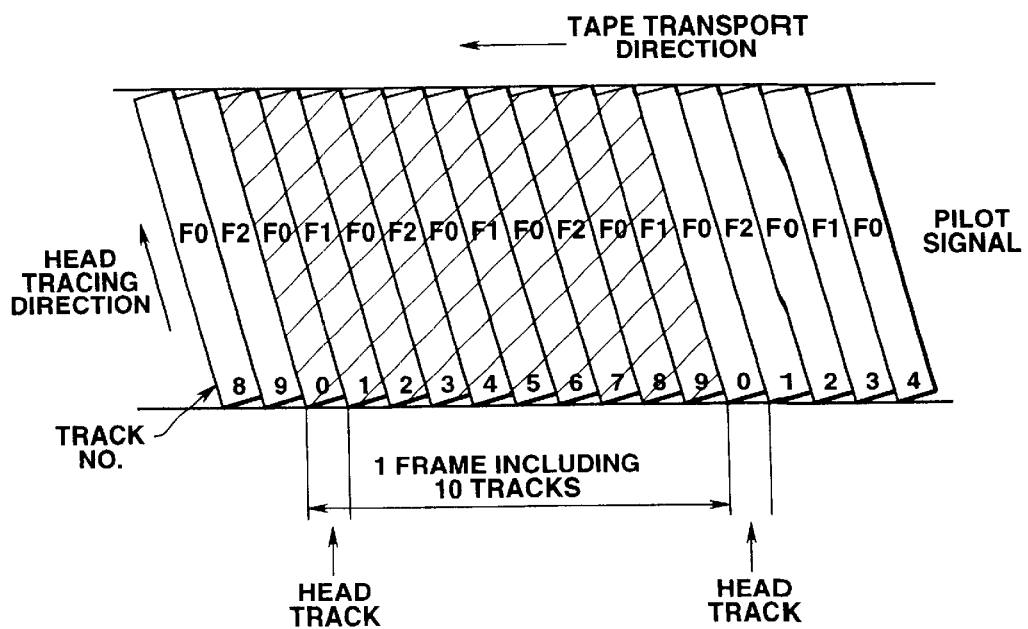
FIG. 6 is a pilot signal.
Figure 4:
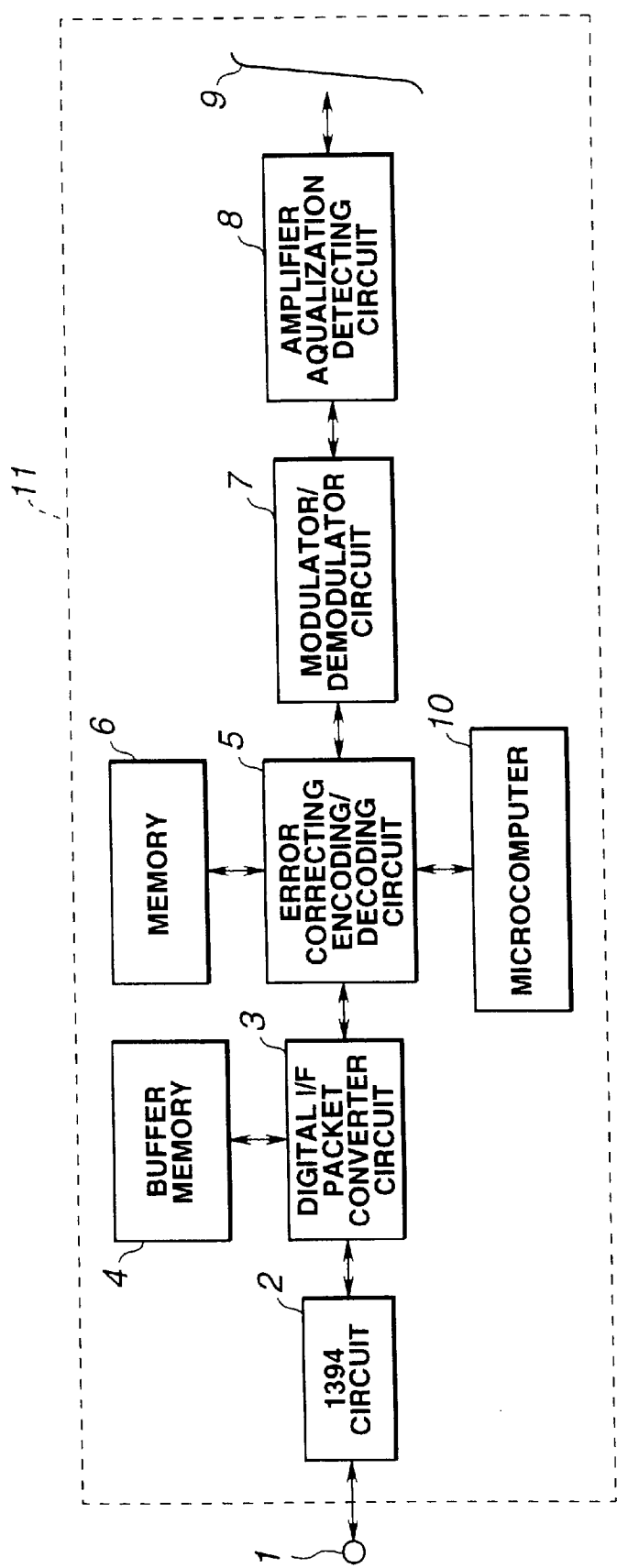
FIG. 4 is a block diagram showing DVTR relevant art.

FIG. 7 shows the detailed configuration of the transmitter 15 shown in FIG. 9. FIG. 8 shows the detailed configuration of the receivers 16–18 shown in FIG. 9. In FIG. 7, a reproduced signal is supplied from a magnetic head (not shown) to an input terminal 21. Such reproduced signal is supplied to a reproduced signal processing circuit 22. The reproduced signal processing circuit 22 processes the reproduced signal in a predetermined way and generates data for dubbing. For example, the reproduced signal processing circuit 22 may be formed by removing the 1394 circuit 2 and the digital I/F packet converter circuit 3 from the reproduction side circuit in FIG. 4.

In this case, the reproduced signal processing circuit 22 equalizes the waveform of the reproduced signal, and demodulates the resulting signal to obtain a reproduced data. The reproduced signal processing circuit 22 corrects any error in the reproduced data, decodes the resulting data, rearranges the data to obtain, for example, a packet conforming to the SD standards from the reproduced data.

In the reproduced signal processing circuit 22, a cylinder servo circuit/tape transport servo circuit 26 controls the reproduced signal processing. The cylinder servo circuit/tape transport servo circuit 26 generates, for example, a head switch pulse and a frame pulse as a reproduction reference signal and a frame reference signal. The head switch pulse is a reference signal for head switching and cylinder revolution in the DVTR. The frame pulse indicates the frame head position of the reproduced signal.

The output of the reproduced signal processing circuit 22 is supplied to a isochronous packet converter circuit 23 as dubbing data. The isochronous packet converter circuit 23 converts the reproduced data into the isochronous packet and outputs the resulting data. The output of the isochronous packet converter circuit 23 is supplied to the digital interface transmitting circuit 25 through a switch 24.

In this embodiment, the cylinder servo circuit/tape transport servo circuit 26 outputs a generated reference signal and a generated frame reference signal to the isochronous packet converter circuit 27. The isochronous packet converter circuit 27 has the same configuration as that of isochronous packet converter circuit 23. This circuit converts the input reference signal (the original timing reference signal) into the isochronous packet and outputs the resulting signal.

Figure 10:
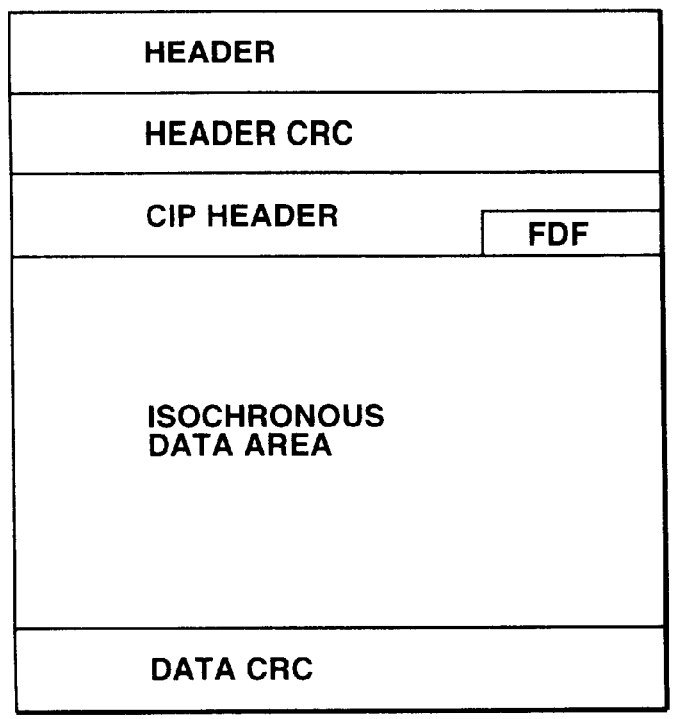
FIG. 10 is an isochronous packet

FIG. 10 shows an example of the isochronous packet coming from the isochronous packet converter circuit 27.

As shown in FIG. 10, the isochronous packet has a header at its head and is followed by a header CRC, a CIP header, an isochronous data area containing an isochronous data and a data CRC in this order. The CIP header includes a FDF area. The frame pulse is inserted in the FDF area as a flag. The reference signal data such as the head switch pulse is inserted in the isochronous data area.

The output of the isochronous packet converter circuit 27 is supplied to the digital interface transmitting circuit 25 through the switch 24. The switch 24 changes over and selects the outputs of the isochronous packet converter circuits 23,27 and sends the output to the digital interface transmitting circuit 25.

The digital interface transmitting circuit 25 controls the link layer and the physical layer of the IEEE 1394 standards. This circuit also sends out the input isochronous packet as the isochronous packet conforming to the IEEE 1394 standards to 1394 cable (not shown) through the output terminal 28.

In the case of this embodiment, the reference signal and the frame reference signal from the cylinder servo circuit/tape transport servo circuit 26 are sent out prior to the transmission of the dubbing data.

On the reception side, the isochronous packet is supplied from the 1934 cable (not shown) to the input terminal 31 in the FIG. 8. The isochronous packet is supplied to digital interface receiving circuit 32. The digital interface receiving circuit 32 controls the link layer and the physical layer of the IEEE 1394. This circuit also receives the input isochronous packet conforming to the IEEE 1394 standards and sends it out to a switch 33.

Of the data supplied to the switch 33, the isochronous packet of the dubbing data is sent to the isochronous packet converter circuit 34, and isochronous packet of the reference signal is sent to the isochronous packet converter circuit 36. The isochronous packet converter circuits 34 and 36 have the same configuration. The isochronous packet converter circuit 34 restores the input isochronous packet conforming into the IEEE 1394 standards into the dubbing data and outputs the resulting data to the recording processing circuit 35. The isochronous packet converter circuit 36 restores the input isochronous packet conforming to the IEEE 1394 standards into the reference signal and the frame reference signal, and outputs the resulting signal to the cylinder servo circuit/tape transport servo circuit 37.

The recording processing circuit 35 processes the input dubbing data min a predetermined way and sends the resulting data to the magnetic head through the output terminal 38. For example, the recording processing circuit 35 may be formed by removing the 1394 circuit 2 and the digital I/F packet converter circuit 3 from the recording side circuit in FIG. 4.

The recording processing circuit 35 corrects any error and encodes the packet conforming to the SD standards and rearranges the data to obtain data of a recording format of the SD standards. In addition, the recording processing circuit 35 corrects any error in the dubbing data, modulates and amplifies the resulting data, and send it to the magnetic data (not shown) through a terminal 38.

In this embodiment, a cylinder servo circuit/tape transport servo circuit 37 controls the recording processing circuit 35.

The cylinder servo circuit/tape transport servo circuit 37 generates its own reference signal and the frame reference signal based on the input reference signal and the frame reference signal. For example, the head switch pulse and the frame pulse are respectively used as the reference signal and the frame reference signal. The cylinder servo circuit/tape transport servo circuit 37 controls the cylinder revolution and the tape transport synchronously with the head switch pulse and the frame pulse.

The cylinder servo circuit/tape transport servo circuit 37 uses the reference signal and the frame reference signal based on the reference signal and the frame reference signal of the transmitter 15. Therefore, its cylinder revolution and the tape transport are synchronized with the cylinder revolution and the tape transport of the transmitter 15. The cylinder servo circuit/tape transport servo circuit 37 sends the generated reference signal and the frame reference signal to the recording processing circuit 35.

The recording processing circuit 35, for example, corrects any error at a timing based on the reference signal and the frame reference signal. The dubbing data is sent out synchronously with the reference signal and the frame reference signal, and the receivers 16–18 record data according to the reference signal and the frame reference signal based on the reference signal and the frame reference signal of the transmitter 15. Therefore, the received data can be synchronized with these signals without storing the data in the buffer memory.

Figure 11:
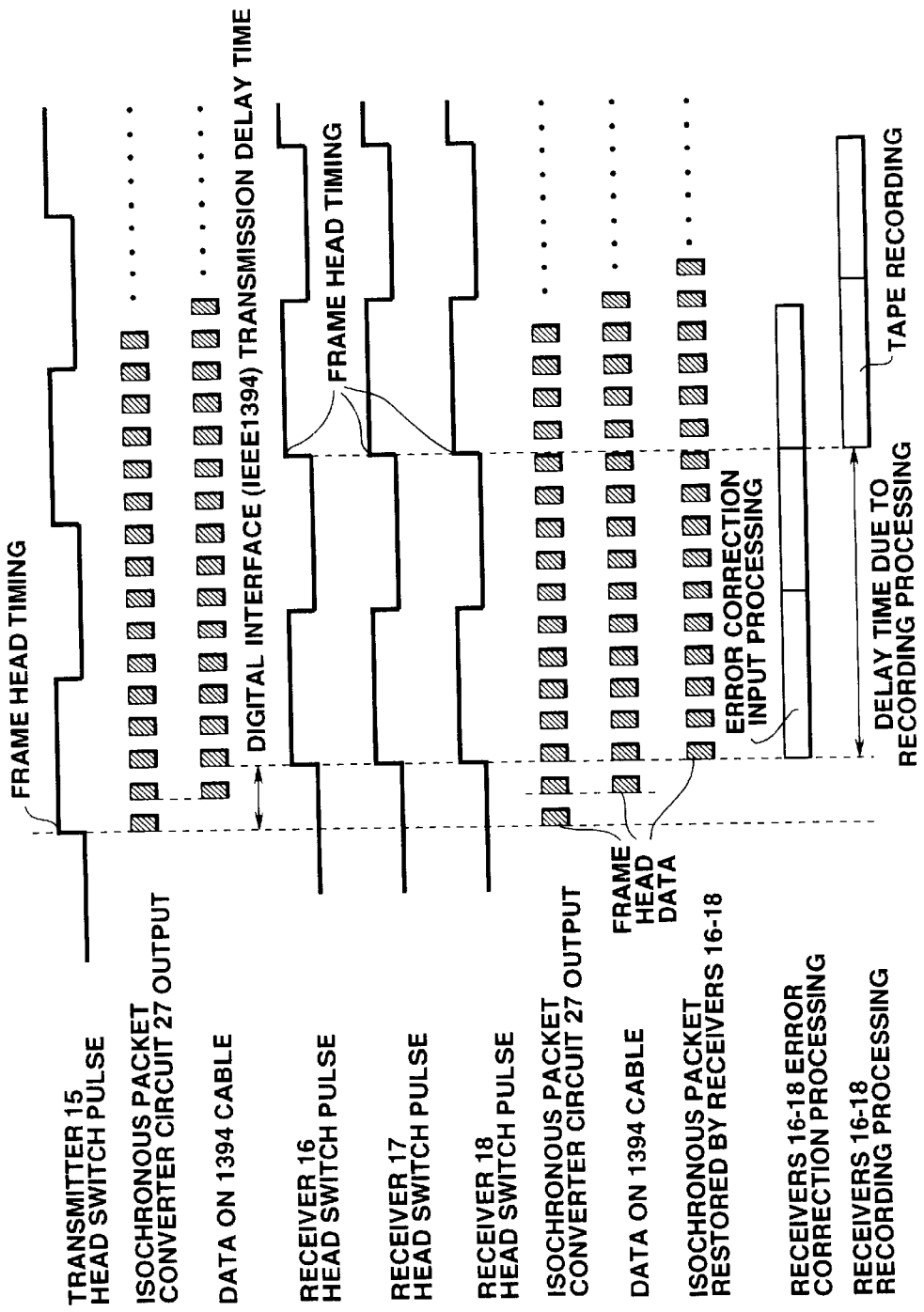
FIG. 11 is a timing chart showing the operation of the embodiment shown in FIGS. 7 and 8.
Figure 12:
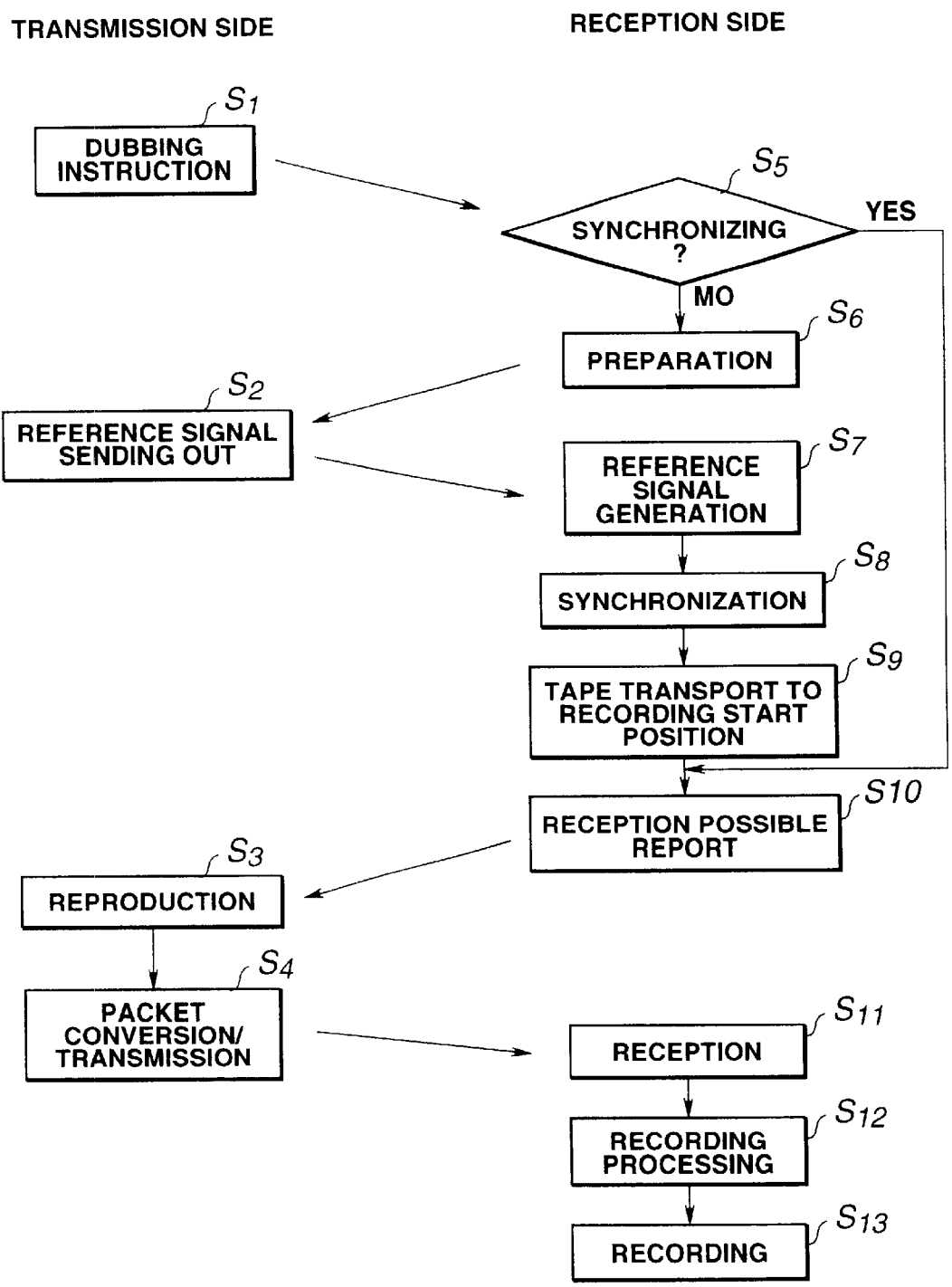
FIG. 12 is a flowchart showing the operation of the embodiment shown in FIGS. 7 and 8.

The operation of the embodiment having such configuration will be described with reference to the timing chart in FIG. 11 and the flowchart in FIG. 12. FIG. 11 shows the following packet, pulse etc. arranged from top to bottom: The head switch pulse of the transmitter 15, the 1394 isochronous packet from isochronous packet converter circuit 27, the isochronous packet on the 1394 cable, the head switch pulse of the receivers 16–18, the 1394 isochronous packet from isochronous packet converter circuit 23, the data on the 1394 cable, the isochronous packet restored by the receivers 16–18, the error correction processing by the receivers 16–18, and the recording processing by the receivers 16–18. In an actual DVTR, the head switch pulse period is 3.33 milliseconds and the isochronous cycle is 125 microseconds. Therefore, a packet of 26 isochronous cycles is transmitted in a half period of the head switch pulse. To simplify the drawing, FIG. 11 does not show correct number of the packets.

With the network configuration shown in FIG. 9, let us assume that the receivers 16–18 receive the isochronous data reproduced by the DVTR as the transmitter 15. Also let us assume that the DVTR as the receivers 16–18 is going to start data recording at a position just after data previously recorded without an unnatural gap on a tape.

Using a network according to this embodiment of the present invention, if the transmitter 15 reports the transmission of the isochronous data (in this case, a dubbing instruction is created.) (in step S1), the receivers 16–18 send out a status command indicating "be in preparation", for example, to the transmitter (step S6) until the receivers 16–18 get ready for recording data, namely, until these receivers are synchronized with the transmitter 15. The receivers 16–18 send out a status command, "now being synchronized" to the transmitter 15. Then the transmitter 15 waits for the transmission of the dubbing data.

Until the synchronization procedure is completed, in each receiver 16–18, the cylinder rotates and the tape is transported independently according to each individual reference signal, and the reference signals for the track, frame, etc. have its individual phase respectively. This synchronization should be completed prior to the transmission of the dubbing data. For example, the synchronization can be made when the device is connected with the 1394 cable. Then, the receivers 16–18 can shorten the in-preparation time. To simplify the drawings, the dubbing data transmission and the reference signal transmission are show at the same timing in FIG. 11.

Let us assume that in the transmitter 15, the head rotates and the tape is transported using the head switch pulse in FIG. 11 as the reference signal. The transmitter 15 sends out the reference signal for synchronization prior to the transmission of the dubbing data (step S2). That is, the cylinder servo circuit/tape transport servo circuit 26 of the transmitter 15 sends the head switch pulse to the isochronous packet converter circuit 27. The isochronous packet converter circuit 27 converts the head switch pulse into the isochronous packet. The isochronous packet shown in FIG. 11 is sent to the digital interface transmitting circuit 25 through the switch 24.

The digital interface transmitting circuit 25 controls the link layer and the physical layer of the IEEE 1394 standards. This circuit also sends out an isochronous packet for transmitting the reference signal from the terminal 28 to the 1394 cable (not shown). The processing in the digital interface transmitting circuit 25 generally requires a predetermined time of about 1 isochronous cycle (125 microseconds). Therefore, as shown in FIG. 11, the isochronous packet is transmitted with such delay time at a transmission rate specified in the IEEE 1394 standards on the 1394 cable.

The isochronous packet shown in FIG. 11 is sent to the digital interface receiving circuit 32 through the terminal 31 of the receivers 16–18. The digital interface receiving circuit 32 controls the link layer and the physical layer of the IEEE 1394 standards. This circuit also receives the isochronous packet and sends it to the isochronous packet converter circuit 36 through the switch 33. Similar to the transmission side, the processing in the digital interface receiving circuit 32 causes a delay time of about 1 isochronous cycle, for example.

The isochronous packet converter circuit 36 restores the isochronous packet into the original reference signal. The resulting signal is sent to the cylinder servo circuit/tape transport servo circuit 37. The cylinder servo circuit/tape transport servo circuit 37 generates the reference signal which is synchronized with the input reference signal as a reference signal for itself (step S7). The cylinder servo circuit/tape transport servo circuit 37 controls the cylinder rotation, the tape transport, the recording processing etc. based on this reference signal (step S8).

The receivers 16–18 perform these processings similarly. That is, as shown in FIG. 11, the receivers 16–18 use the synchronized head switch pulse with the delay time of 2 isochronous cycle from the head switch pulse to the transmitter 15. The receivers 16–18 restores their own frame pulses using the frame pulse inserted in the FDF area of the CIP header of the isochronous data as a flag. The frame pulse can be also synchronized among the receivers 16–18.

The receivers 16–18 require 2 track periods, for example, for error correction processing. Therefore, the receivers 16–18 use a frame pulse with the delay time of 2 isochronous cycles+2 track periods from the head switch pulse for the transmitter 15.

Therefore, the reproduction timing of the transmitter 15 is synchronized with the recording timing of the receivers 16–18 with the delay time of 2 isochronous cycles+2 track periods. The receivers 16–18 transport the tape to its own recording position (the head frame position) (step S9), then keep it in a pause mode. The cylinder rotates according to the reference signal.

The receivers 16–18 output asynchronous signals to the transmitter 15, indicating that they can receive data or the transmitter can send out data to the receivers (step S10). Then the transmitter 15 can send out a dubbing data.

The transmitter 15 traces the tape with the magnetic head according to the head switch pulse shown in FIG. 11 to reproduce data recorded on a tape (not shown)(step S3). The reproduced signal is sent to the reproduction processing circuit 22 for waveform equalization, demodulation, error correction, etc. The reproduced signal is also sent to the isochronous packet converter circuit 23 as the dubbing data, and, as shown in FIG. 11, the isochronous packet can be obtained synchronously with he head switch pulse from the frame head position.

This isochronous packet is sent to the digital interface transmitting circuit 25 through the switch 24, and is transmitted from the terminal 28 to the 1394 cable with the delay time of 1 isochronous cycle at the transmission rate of the IEEE 1394 standards (step S4).

The isochronous packet of the dubbing data shown in FIG. 11 is transmitted over the 1394 cable. This isochronous packet is sent to the digital interface receiving circuit 32 of each receiver 16–18 (step S11). The digital interface receiving circuit 32, as shown in FIG. 11, delays the input isochronous packet by 1 isochronous cycle and sends the resulting packet to the isochronous packet converter circuit 34 through the switch 33.

The isochronous packet converter circuit 34 restores the isochronous packet into the original dubbing data, for example, an image packet or a audio packet of the SD standards and sends the resulting data to the recording processing circuit 35 (step S12). That is, the packet of the dubbing data is sent to the recording processing circuit 35 at the timing shown in FIG. 11. This timing leads the frame head timing of the receivers 16–18 by 2 track periods.

The recording processing circuit 35 corrects data and encodes the input packet and rearranges the data to obtain a recording format of the SD standards. In addition, the recording processing circuit 35 modulates and amplifies the dubbing data already error-corrected and encoded, and send the resulting data to the magnetic head (not shown) through a terminal 38.

The cylinder servo circuit/tape transport servo circuit 37 starts the tape transport with the delay time due to recording processing in the recording processing circuit 35, and starts the recording of the dubbing data by head tracing (step S13). The delay time due to the recording processing in the recording processing circuit 35 is 2 track periods. As shown in FIG. 11, the magnetic head starts data recording from the frame head position on a tape.

The receivers 16–18 employ mutually synchronized head switch pulse for processing, so every receiver 16–18 starts data recording from the frame head position. The receivers 16–18 are in standby mode at a frame head position, all the receivers 16–18 can surely start data recording at a position just after data previously recorded without an unnatural gap.

As described above, with this embodiment, the reference signal is transmitted prior to the transmission of the dubbing data, and all the receivers are synchronized with each other using this reference signal. Then the dubbing data is transmitted. Therefore, synchronous dubbing is possible on the reception side without using a buffer memory with large capacity. The receivers use the reference signal based on the transmitter reference signal. Therefore, even though the transmitter sends out the dubbing data reproduced according to its own reference signal, the reception side can start data recording from the frame head position without using a buffer memory with large capacity. It is clear that the transmission side does not require a buffer memory with large capacity. That is, neither transmitter nor receiver requires a buffer memory with large capacity. The reception side can start data recording from a predetermined recording position. Therefore, it is possible to reduce the circuit scale of a dubbing device.

In the above description, the transmission delay time is 1 or 2 isochronous cycles. However, its delay time is not limited to this value. Any delay time will do.

In the embodiment, the transmitter sends out the reference signal to the receiver to generate a receiver reference signal. However, it is clear that any device in the network can send out the reference signal. For example, a device which controls the whole network can send out the reference signal, another transmitter and receiver can generate the reference signal according to the transmitted reference signal to synchronize the reproduction timing with the recording timing.

Figure 13:
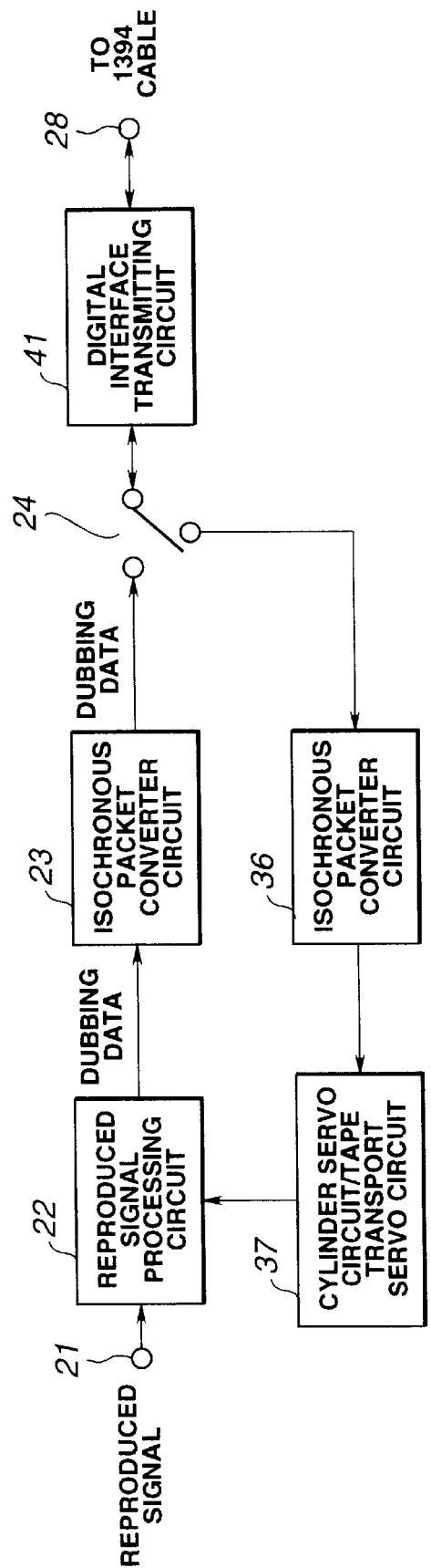
FIGS. 13 and 14 are block diagrams showing another embodiment of the present invention.
Figure 14:
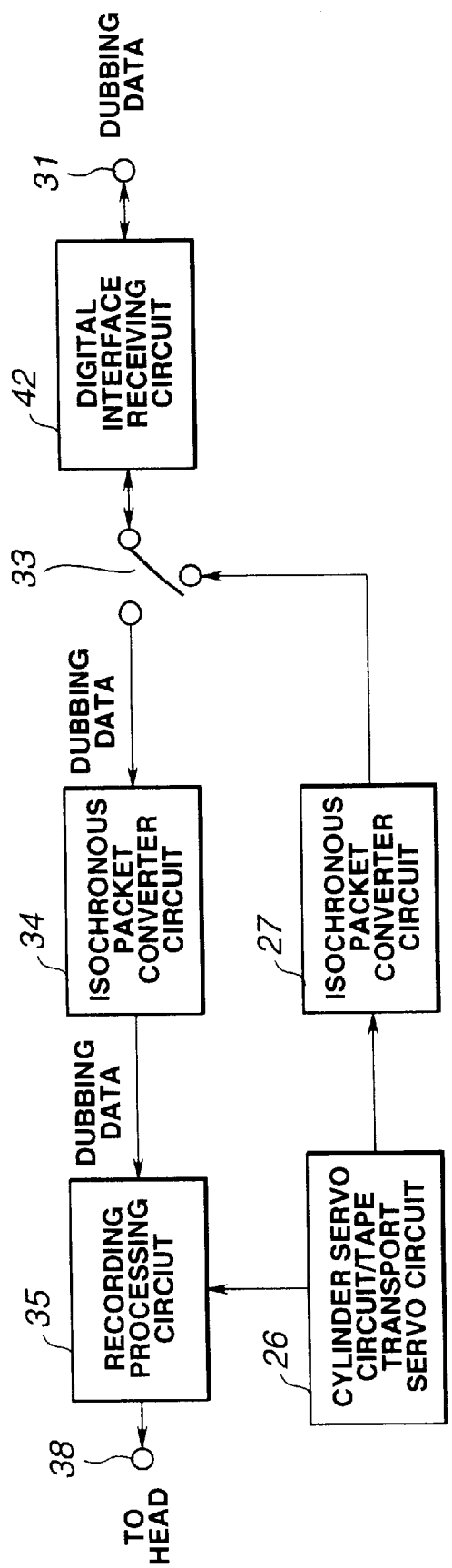

For example, FIGS. 13 and 14 are block diagrams in which one of the receivers transmits the reference signal, and other receivers or the transmitter generates its own reference signal according to the reference signal transmitted by the transmitter 15. FIG. 13 shows the transmission side. FIG. 14 shows one receiver which transmits the reference signal. The configuration of other receivers is the same as that shown in FIG. 8. In FIGS. 13 and 14, the same components bear the same numerals as those in FIGS. 7 and 8. The description of these components is omitted here.

The transmitter shown in FIG. 13 is different from the transmitter shown in FIG. 7 in that it employs an isochronous packet converter circuit 36 and a cylinder servo circuit/tape transport servo circuit 37 instead of the isochronous packet converter circuit 27 and the cylinder servo circuit/tape transport servo circuit 26, and uses a digital interface transmitting/receiving circuit 41 instead of the digital interface transmitting circuit 25.

The digital interface transmitting/receiving circuit 41 has the function of the digital interface transmitting circuit 25 and that of the digital interface receiving circuit 32. For example, the digital interface transmitting/receiving circuit 41 controls the link layer and the physical layer of the IEEE 1394 standards. That circuit sends out the isochronous packet from the switch 24 to the 1394 cable, and receives the isochronous packet flowing in the 1394 cable to output it to the switch 24.

As shown in FIG. 14, one receiver which sends out the reference signal is different from the receiver shown in FIG. 8 in that it employs a cylinder servo circuit/tape transport servo circuit 26 and an isochronous packet converter circuit 27 instead of the cylinder servo circuit/tape transport servo circuit 37 and the isochronous packet converter circuit 36, and uses a digital interface transmitting/receiving circuit 42 instead of the digital interface receiving circuit 32.

With this embodiment, the receiver shown in FIG. 14 sends out the reference signal prior to the transmission of the dubbing data. That is, the cylinder servo circuit/tape transport servo circuit 26 outputs a reference signal for its own to the isochronous packet converter circuit 27. The isochronous packet converter circuit 27 converts the reference signal into the isochronous packet and sends out the resulting packet to the digital interface transmitting/receiving circuit 42 then to the 1394 cable through the switch 33.

The reference signal flowing through the 1394 cable is sent to the transmitter shown in FIG. 13 and other receivers having the same configuration as that shown in FIG. 8. In the case of the transmitter shown in FIG. 13, the digital interface transmitting/receiving circuit 41 receives the isochronous packet and sends it out to the isochronous packet converter circuit 36 through the switch 24. The isochronous packet converter circuit 36 restores the isochronous packet into its original reference signal and sends the signal to the cylinder servo circuit/tape transport servo circuit 37.

The cylinder servo circuit/tape transport servo circuit 37 generates its own reference signal based on the input reference signal. The cylinder servo circuit/tape transport servo circuit 37 generates a reference signal of a timing, taking a delay time due to the packet conversion processing, the recording/reproduction processing, etc. into consideration.

Other receivers having the same configuration as that shown in FIG. 8 generate a reference signal for the transmitted reference signal, taking a delay time due to the packet conversion processing, the recording/reproduction processing, etc. into consideration.

After achieving synchronization between the transmitter and the receivers, the transmitter sends out the dubbing data to the receivers. The operation of dubbing data transmission and recording is the same as that for the embodiment shown in FIGS. 7 and 8.

In the above-mentioned embodiments, the network comprising one transmitter and a plurality of the receivers is described. In the case of the IEEE 1394 standards, data can be transmitted through a plurality of channels. In a network, a plurality of the transmitters can send data through multiple channels and one or more receivers can record the data. The present invention is applicable to such case.

In this case, it is possible for other transmitters to use a reference signal from one transmitter. By so doing, a plurality of the transmitters can be synchronized with a plurality of the receivers. Therefore, data transmitted from two transmitters can be transmitted through multiple channels and the data can be dubbed synchronously by one receiver.

If one of these receivers does not record synchronously such multiple channel data from a plurality of the transmitter, a reference signal for each channel may have the same or different phase.

In the above-mentioned embodiments, the DVTR is used as the transmitter and the receiver and the head switch pulse as the reference signal. It goes without saying that a recording/reproducing device of other type such as a DVD (Digital Video Disk) can be used instead of the DVTR.

In addition, any other digital interface through which an isochronous data can be transmitted can be used as a transmission path instead of the digital interface of the IEEE 1394 standards described above.

Availability in Industry

As described above, an apparatus having a digital interface and a digital interfacing method according to the present invention are useful for controlling recording processing among a plurality of devices connected through a network. For example, the present invention is suitable for recording new data by dubbing at a position just after data previously recorded without an unnatural gap on a network corresponding to the IEEE 1394 standards.

What is claimed is:

1. An apparatus having a digital interface, comprising:

timing reference signal timing means which is installed in at least one first device in a network comprising a plurality of devices, converts an original timing reference signal into first data to be transmitted synchronously and sends out the resulting data to a transmission path forming said network, timing reference signal generating means which is installed in a second device other than said at least one first device in said network and generates a timing reference signal based on said first data transmitted through said transmission path, transmitting means which is installed in a least one first device in said network, converts a predetermined transmitted data into second data to be synchronously transmitted, by synchronizing the predetermined transmitted data with said original timing reference signal or said timing reference signal and sends out the resulting data to said transmission path, and recording means which is installed in at least one of said plurality of devices other than said at least one first device having said transmitting means in said network, receives said second data to be synchronously transmitted through said transmission path, and record the received data synchronously with said original timing reference signal or said timing reference signal, wherein said one or more first devices in said network is the same device having said transmitting means and has a reproducing means to obtain said second data to be synchronously transmitted and wherein said original timing reference signal is a reproduction timing signal of said reproducing means.

2. An apparatus having a digital interface, comprising:

timing reference signal transmitting means which is installed in at least one first device in a network comprising a plurality of devices, converts an original timing reference signal into first data to be transmitted synchronously and sends out the resulting data to a transmission path forming said network, timing reference signal generating means which is installed in a second device other than said at least one first device in said network and generates a timing reference signal based on said first data transmitted through said transmission path, transmitting means which is installed in a least one first device in said network, converts a predetermined transmitted data into second data to be synchronously transmitted, by synchronizing the predetermined transmitted data with said original timing reference signal or said timing reference signal and sends out the resulting data to said transmission path, recording means which is installed in at least one of said plurality of devices in said network, receives said second data to be synchronously transmitted through said transmission path, and records the received data synchronously with said original timing reference signal or said timing reference signal, wherein said at least one of said plurality of devices having said recording means includes a reporting means which reports that the recording means is synchronized with said timing reference signal, and a standing-by means which keeps the recording means in standby mode for starting recording processing at a predetermined recording start position on a recording medium after the recording means is synchronized with said timing reference signal, wherein said at least one of said plurality of devices having said transmitting means includes a detecting means for detecting that a report from said reporting means is generated in all the devices having said recording means and wherein after detecting that all devices having said recording means are synchronized with said timing reference signal, all the devices having said recording means can achieve synchronous recording by sending out said second data to be synchronously transmitted from said transmitting means.

3. A digital interfacing method, comprising:

a timing reference signal transmitting procedure in which an original timing reference signal from at least one first device in a network comprising a plurality of devices is converted into first data to be synchronously transmitted and the resulting data is sent to a transmission path in said network, a synchronizing procedure in which said original timing reference signal transmitted through said transmission path is received by a second device other than said at least one first device in said network and the received signal is synchronized by obtaining a recording timing reference signal based on said transmitted original timing reference signal, a transmitting procedure in which at least one first device in said network converts predetermined transmission data into second data to be synchronously transmitted with said original timing reference signal or said timing reference signal and sends the resulting data to said transmission path, and a recording procedure in which at least one of said plurality of devices other than said at least one first device having said transmitting means in said network receives said second data to be synchronously transmitted through said transmission path and records the data synchronously with said original timing reference signal or said timing reference signal, wherein said at least one first device in said network is the same device which performs said transmitting procedure and wherein said transmitting procedure includes a reproducing procedure for reproduction processing to obtain said second data to be synchronously transmitted using said original timing reference signal and a reproduction timing reference.

4. A digital interfacing method, comprising:

a timing reference signal transmitting procedure in which an original timing reference signal from at least one first device in a network comprising a plurality of devices is converted into first data to be synchronously transmitted and the resulting data is sent to a transmission path in said network, a synchronizing procedure in which said original timing reference signal transmitted through said transmission path is received by a second device other than said at least one first device in said network and the received signal is synchronized by obtaining a recording timing reference signal based on said transmitted original timing reference signal, a transmitting procedure in which at least one of said plurality of devices in said network converts predetermined transmission data into second data to be synchronously transmitted with said original timing reference signal or said timing reference signal and sends the resulting data to said transmission path, and a recording procedure in which said at least one of said plurality of devices in said network receives said second data to be synchronously transmitted through said transmission path and records the data synchronously with said original timing reference signal or said timing reference signal, wherein the following procedures are added between said synchronizing procedure and said transmitting procedure:

a procedure which reports that said second device in said network is synchronized with said timing reference signal, and at the same time sets said recording procedure performing device in standby mode for recording data at a predetermined recording start position on a tape and a detecting procedure for detecting that all of said second devices in said network are synchronized with said reference signal.

* * * * *